F. STENGEL.
Improvement in Fly-Traps.
No. 129,763.  Patented July 23, 1872.
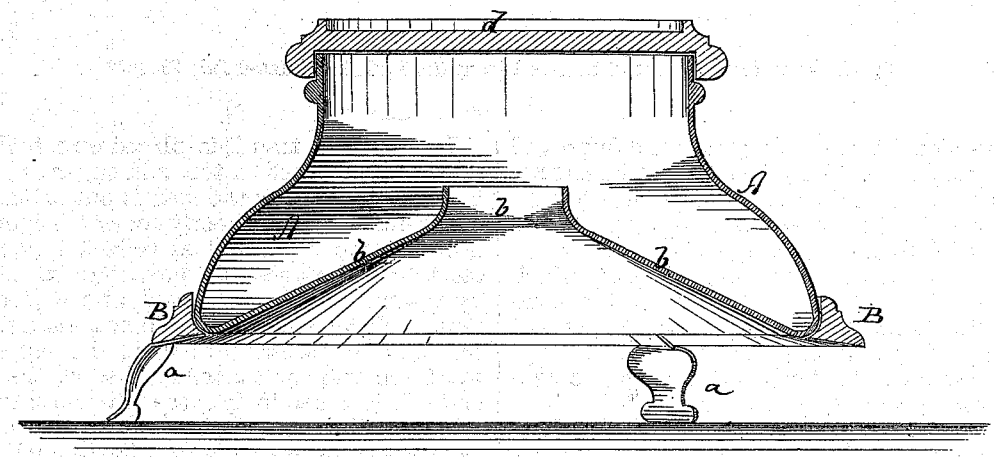
Witnesses:
Alex F. Roberts
Frank Blockley
Inventor:
F. Stengel
Per
Attorneys.

UNITED STATES PATENT OFFICE.

FRIEDERIC STENGEL, OF NEW YORK, N. Y.

IMPROVEMENT IN FLY-TRAPS.

Specification forming part of Letters Patent No. 129,763, dated July 23, 1872.

Specification describing a new and Improved Fly-Trap, invented by FRIEDERIC STENGEL, of the city, county, and State of New York.

The drawing represents a vertical central section of my improved fly-trap.

This invention relates to a new fly-trap, which is open at the bottom and closed on top to enable the flies to enter from below, but prevent them, owing to their peculiar habit of not flying downward in a small chamber, from escaping when once they have entered.

A in the drawing represents the body of the fly-trap, made of glass, with legs or supports $a\ a$, whereby its bottom is raised above the supporting table or article. The bottom $b$ of the trap is made perforated, and, by preference, slightly conical, as shown. The top of the trap A is closed by a stopple or plate, $d$, or by any other suitable means.

The glass body A may be made in suitable form, longer or wider in proportion than shown, and may have the legs $a$ formed on it of glass or on a separate supporting-frame, B.

In using the trap it is placed on a table or support and closed on top, and sugar or other matter attractive to the flies is put on the table under the trap, directly below the opening in the bottom $b$. The flies collected on such attractive substance will, on every disturbance, fly upward and enter the trap, whence, for the reason above stated, they do not escape. It will only be necessary to wave the hand toward the trap or otherwise disturb the flies under it to cause their entry into the trap.

Having thus described my invention, I claim as new and desire to secure by Letters Patent—

The fly-trap composed of transparent glass body A having supports $a\ a$, the conical perforated bottom $b$, and the stopple $d$, constructed and put together as described.

FRIEDERIC STENGEL.

Witnesses:
T. B. MOSHER,
W. A. GRAHAM.